United States Patent
Bjorkman, Jr. et al.

(10) Patent No.: US 6,579,386 B1
(45) Date of Patent: Jun. 17, 2003

(54) FILLER WIRE FOR ALUMINUM ALLOYS AND METHOD OF WELDING

(75) Inventors: Gerald W. O. Bjorkman, Jr., Huntsville, AL (US); Alex Cho, Darien, IL (US); Carolyn K. Russell, Huntsville, AL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/526,238

(22) Filed: Mar. 15, 2000

Related U.S. Application Data (60) Provisional application No. 60/124,402, filed on Mar. 15, 1999.

(51) Int. Cl.⁷ ............................ C22C 21/00; C22C 21/12
(52) U.S. Cl. ....................................... 148/437; 148/438
(58) Field of Search ................... 420/528, 529, 420/539, 552; 148/437, 438

(56) References Cited

U.S. PATENT DOCUMENTS

| | | | |
|---|---|---|---|
| 4,610,733 A | * | 9/1986 | Sanders, Jr. et al. |
| 4,859,544 A | | 8/1989 | Schwellinger .............. 428/654 |
| RE33,092 E | * | 10/1989 | Sanders, Jr. et al. |
| 5,032,359 A | * | 7/1991 | Pickens et al. |
| 5,122,339 A | * | 6/1992 | Pickens et al. |
| 5,211,910 A | * | 5/1993 | Pickens et al. |
| 5,389,165 A | | 2/1995 | Cho ............................ 148/552 |
| 5,512,112 A | * | 4/1996 | Cassada, III ................. 148/550 |
| 5,512,241 A | * | 4/1996 | Kramer et al. |
| 5,597,529 A | * | 1/1997 | Tack |

FOREIGN PATENT DOCUMENTS

| | | | | |
|---|---|---|---|---|
| AU | 732493 | | 10/1998 | ........... B23K/35/28 |
| JP | 59-123735 A | * | 7/1984 | ........... C22C/21/12 |
| JP | 03-107440 A | * | 5/1991 | ........... C22C/21/12 |
| RU | 1600176 A1 | * | 12/1996 | ........... B23K/35/28 |
| WO | WO 99/17903 | | 10/1998 | ........... B23K/35/38 |
| WO | WO-99/07906 | * | 2/1999 | |

OTHER PUBLICATIONS

U.S. patent application Ser. No. 09/525,407, Bjorkman et al. no date available.

* cited by examiner

*Primary Examiner*—Roy King
*Assistant Examiner*—Harry D. Wilkins, III
(74) *Attorney, Agent, or Firm*—Marsh Fischmann & Breyfogle LLP (57) ABSTRACT

A weld filler wire chemistry has been developed for fusion welding 2195 aluminum-lithium. The weld filler wire chemistry is an aluminum-copper based alloy containing high additions of titanium and zirconium. The additions of titanium and zirconium reduce the crack susceptibility of aluminum alloy welds while producing good weld mechanical properties. The addition of silver further improves the weld properties of the weld filler wire. The reduced weld crack susceptibility enhances the repair weldability, including when planishing is required.

16 Claims, 8 Drawing Sheets

FIGURE 1

HIGH DISPERSOID FILLER WIRE CHEMISTRIES

| FILLER WIRE # | COPPER (%) | MANGANESE (%) | TITANIUM (%) | ZIRCONIUM (%) |
|---|---|---|---|---|
| 71106 | 6.0 | | 0.30 | 0.34 |
| 71107 | 5.0 | | 0.28 | 0.26 |
| 71108 | 4.0 | | 0.24 | 0.25 |
| 71109 | 4.0 | 0.27 | 0.27 | 0.26 |

FIGURE 2

AVERAGED ROOM TEMP. TENSILE DATA FOR HIGH DISPERSOID FILLER WIRE SCREENING

| FILLER WIRE # | WELD TYPE | QTY. | FTY (ksi) | FTU (ksi) | e (%) * | e (%) ** |
|---|---|---|---|---|---|---|
| 71106 | VPPA | 3 | 34.87 | 54.27 | 5.62 | 2.82 |
| ------ | R5/PLANISHED | 3 | 36.43 | 52.03 | 3.86 | 1.91 |
| 71108 | VPPA | 3 | 33.57 | 52.13 | 6.94 | 3.48 |
| ------ | R5/PLANISHED | 3 | 34.80 | 49.07 | 5.76 | 2.85 |
| 71109 | VPPA | 3 | 33.33 | 50.50 | 5.35 | 2.67 |
| ------ | R9/PLANISHED | 3 | 36.17 | 48.93 | 4.88 | 2.43 |

\*    1.0 - inch gauge length
\*\*   2.0 - inch gauge length

FIGURE 3

AVERAGED ROOM TEMP. AND -320_F R5/PLANISHED TENSILE DATA FOR HIGH DISPERSOID FILLER WIRES

| FILLER WIRE # | TEST TEMP. | QTY. | FTY (ksi) | FTU (ksi) | e (%) * | e (%) ** |
|---|---|---|---|---|---|---|
| 71106 | ROOM | 4 | 35.35 | 47.55 | 3.32 | 1.64 |
| | -320_F | 4 | 48.33 | 58.65 | 2.68 | 1.58 |
| 71108 | ROOM | 4 | 35.70 | 47.28 | 3.33 | 1.66 |
| | -320_F | 4 | 45.65 | 59.08 | 3.28 | 1.58 |

\*    1.0 - inch gauge length
\*\*   2.0 - inch gauge length

FIG.4

WELD FILLER WIRE CHEMISTRIES

| CHEMISTRY | Cu | Ag | Mg | Zn | TI | Zr | COMMENTS |
|---|---|---|---|---|---|---|---|
| #15 | 6.00 | | 0.40 | 0.40 | 0.25 | 0.25 | DOE CONFIRMATION |
| #16 | 6.00 | 0.40 | | 0.40 | 0.25 | 0.25 | SILVER W/ZINC |
| #17 | 6.00 | 0.40 | 0.40 | | 0.25 | 0.25 | SILVER W/MAGNESIUM |
| #18 | 6.00 | 0.40 | | | 0.25 | 0.25 | SILVER ALONE |

FILLER WIRE FOR ALUMINUM ALLOYS AND METHOD OF WELDING

RELATED APPLICATIONS

This application claims priority under 35 USC 119(e) to U.S. provisional application No. 60/124,402 entitled Improved Filler Wire for Aluminum Alloys and Method of Welding filed Mar. 15, 1999, which is incorporated herein by reference in its entirety. In addition, this application is related to copending U.S. patent application ser. No. 09/525,407 entitled High Titanium/Zirconium Filler Wire for Aluminum Alloys and Method of Welding, also having a priority date of Mar. 15, 1999.

GOVERNMENT CONTRACT

Portions of this invention were invented under contract from the National Aeronautics and Space Administration (NASA), contract number NAS8-39929.

TECHNICAL FIELD OF THE INVENTION

This invention relates generally to the field of welding, and more particularly to an improved filler wire for aluminum alloys and method of welding.

BACKGROUND OF THE INVENTION

Aluminum alloys are used in numerous applications, including car bodies, storage vessels, and the like. One particular type of aluminum alloy is aluminum-lithium alloys. Aluminum-lithium alloys are often used in space vehicles, such as the external tank of the Space Shuttle. Welding aluminum alloys, and in particular aluminum-lithium alloys, is often difficult due to the propensity for weld cracking. Cracks in the weld reduce the strength of the weld and can also create leakage paths in the weld. In particular, a poor weld can result in stress concentrators, reduced resistance to low cycle and high cycle fatigue, and a reduction in corrosion resistance.

Filler wire is used in the welding process. The chemistry, fabrication, and welding process of the filler wire can greatly affect the propensity of the weld to crack. "Chemistry" refers to the elemental components of the filler wire. Herein, any reference to the chemistry or chemical composition of the filler wire by percentage composition shall mean percentage composition by weight (wt. %). "Fabrication" refers to the specialized process that the filler wire is fabricated. "Welding Process" refers to the particular type of welding process used to produce the weld, such as variable plasma arc (VPPA), gas tungsten arc (GTA), gas metal arc (GMA), and soft plasma arc (SPA) welding, as well as the specific parameters surrounding the welding process, such as preheating and the electrode temperature.

Conventional aluminum alloy filler wires do not sufficiently reduce the number of cracks in the weld. As a result, the welded part must often be scrapped or the weld repaired. Weld repair is often accomplished by grinding-out the old weld and then rewelding the parts. Both scrapping the parts and weld repair are expensive and time consuming. Accordingly, the cost and fabrication time of the final product is increased.

SUMMARY OF THE INVENTION

Accordingly, a need has arisen for an improved filler wire. The present invention provides an improved filler wire for aluminum alloys and method of welding that substantially reduces or eliminates problems associated with prior systems and methods.

In accordance with one embodiment of the present invention, titanium and zirconium are added to the filler wire in amounts greater than conventional filler wires, and a nominal amount of silver is also added to the filler wire. The addition of silver is believed to promote the formation of grain boundary phases that improves weldability. The titanium/zirconium/silver filler wire chemistry has been demonstrated to reduce the susceptibility of aluminum alloy welds to cracks.

The present invention may be characterized by the following:

1. An improved weld filler wire for aluminum alloys comprising zirconium in an amount greater than 0.25%, titanium, and silver.
2. The improved weld filler wire of Paragraph 1, wherein the weld filler wire comprises greater than 0.25% titanium.
3. An improved weld filler wire for aluminum alloys comprising titaninum in an amount greater than 0.25%, zirconium, and silver.
4. The improved weld filler wire of Paragraph 1, wherein the weld filler wire further comprises about 0.4% silver.
5. The improved weld filler wire of Paragraph 1, wherein the weld filler wire further comprises copper in an amount ranging from about 4% to about 6%.
6. The improved weld filler wire of Paragraph 1, wherein the weld filler wire further comprises about 6% copper.
7. The improved weld filler wire of Paragraph 2, wherein the weld filler wire further comprises about 0.4% silver.
8. The improved weld filler wire of Paragraph 2, wherein the weld filler wire further comprises copper in an amount ranging from about 0.4% to about 6%.
9. The improved weld filler wire of Paragraph 2, wherein the weld filler wire further comprises about 6% copper.
10. The improved weld filler wire of Paragraph 3, wherein the weld filler wire further comprises about 0.4% silver.
11. The improved weld filler wire of Paragraph 3, wherein the weld filler wire further comprises copper in an amount ranging from about 4% to about 6%.
12. The improved weld filler wire of Paragraph 3, wherein the weld filler wire further comprises about 6% copper.
13. An improved weld filler wire for aluminum alloys comprising 4% to 9% copper, 0.1% to 1.0% silver, 0.15% to 0.5% zirconium, 0.15% to 0.5% titanium, up to 1.0% magnesium, up to 1.0% zinc, 0.5% maximum iron and 0.5% maximum silicon.
14. The improved weld filler wire of Paragraph 13 further comprising 0.1% to 1% manganese.
15. The improved weld filler wire of Paragraph 13 further comprising 0.1% to 1.0% hafnium.
16. The improved weld filler wire of Paragraph 13 further comprising 0.1% to 0.6% scandium.
17. The improved weld filler wire of Paragraph 13 further comprising 0.1% to 1.0% vanadium.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like referenced numerals represent like parts, in which.

DETAILED DESCRIPTION

The present invention is used in the welding of aluminum alloys, and is particularly suited for fusion welding 2195 aluminum-lithium. The filler wire can be used with a number of fusion welding processes, such as variable plasma arc (VPPA), gas tungsten arc (GTA), gas metal arc (GMA), and soft plasma arc (SPA) welding. The weld filler wire chemistries are an improvement over the conventional filler wires, such as 4043 filler wire. For example, compared to 4043, improved weld and repair weld mechanical properties are achieved. The additions of titanium and zirconium significantly improves grain structure refinement in the weld. The addition of silver is believed to promote the formation of grain boundary phases that improve weldability.

During a development program of 2195 Aluminum-Lithium, a 2319 filler wire chemistry was cast as a control sample for an L8 orthogonal array. The 2319 chemistry was discovered to contain 0.22 percent zirconium (Zr). This was within the 2319 specification limit of 0.10 to 0.25% Zr; however, it was not the 2319 nominal value of 0.13% Zr typically used in welding. The 2319 with 0.22% Zr filler wire chemistry produced a greatly refined weld grain structure not seen with nominal 2319. Furthermore, two important observations were made in 0.320-inch-thick 2195-RT70 variable polarity plasma arc (VPPA) welds. The first observation was weld fusion line and crater cracks were significantly reduced at sudden weld stops, or "E-stops." The second observation was the elimination of micro-cracks in the first pass of a two pass VPPA weld.

During the same time frame, the Space Shuttle's Super Lightweight External Tank Program (SLWT), was encountering problems repair welding 2195 aluminum-lithium VPPA welds made with 2319 filler wire. The repair welding involved "R5" repair welding and planishing, which was baselined by the SLWT program as the critical requirement for filler wire acceptance. The repair welds were produced using manual gas tungsten arc (GTA) welding. The R5 repair, which consisted of making five 3.0-inch-long manual repair welds in the same weld location, simulated a production repair having been reworked five times. The R5 repairs were planished to simulate "oil can" repairs on the propellant tank caused by the repair weld shrinkage. Then they were processed into 1.0-inch-wide straight bar tensile specimens and tested at room and −320 degrees F. temperatures. Various tensile specimens displayed low tensile values at room and −320 degrees F. temperature that were below acceptable limits.

Figure 1:
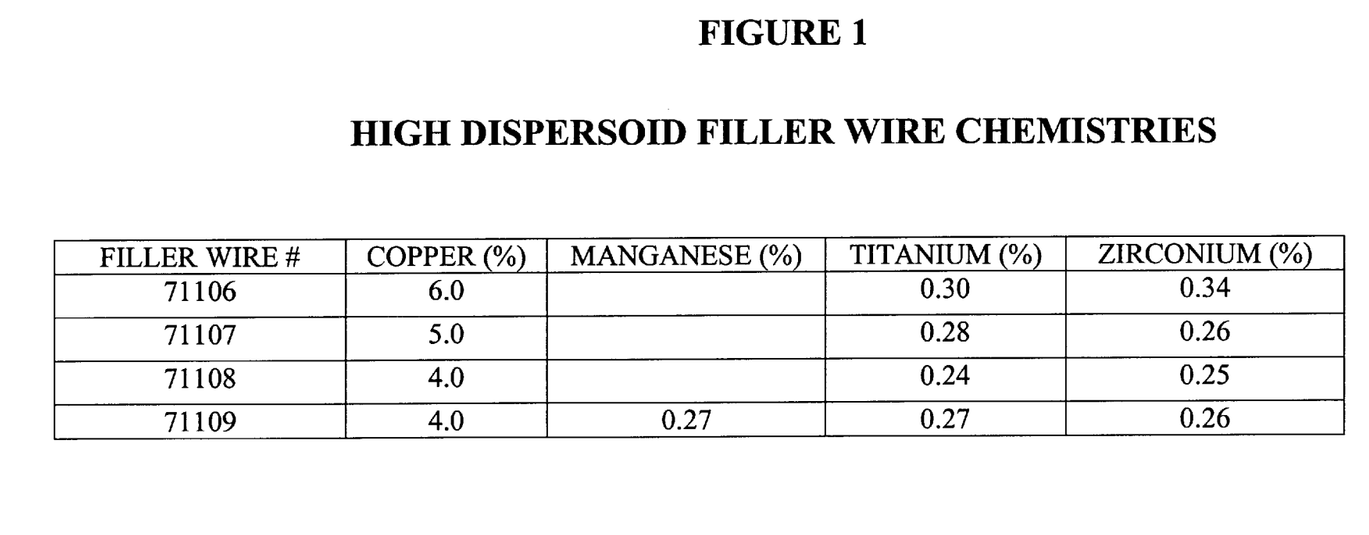
FIG. 1 is chart illustrating the chemistry of various filler wires in accordance with the present invention.

As a result, development was initiated to provide additional 2319 variants to improve room temperature and −320 degrees F. tensile properties of planished R5 repair welds. New filler wire chemistries were formulated containing nominal and low copper (Cu) with high levels of titanium (Ti) and zirconium (Zr). Four filler wire chemistries listed in FIG. 1 were produced into 1/16-inch-diameter spooled filler wire by Reynolds Metals Company. In order to evaluate high and low Cu additions and the effect of Mn, chemistries #71106, #71108, and #71109 were selected for VPPA and repair weld mechanical property screening. One 0.200-inch-thick×15.0-inch-wide×16.0-inch-long VPPA weld panel was produced with each filler wire chemistry. On each panel, one 3.0-inch-long R5 repair weld was performed using direct current electrode negative (DCEN) gas tungsten arc (GTA) welding. The repair welds were performed with the same filler wire chemistry used in the VPPA weld.

The completed R5 repair welds for mechanical property screening were inspected, planished, and re-inspected. Three one-inch-wide straight bar tensile specimens were taken from VPPA and repair weld areas of each panel and tested at room temperature. Two metallographic specimens were taken from both VPPA and repair weld areas. Because the Mn addition showed no improvements, chemistry #71109 was eliminated from further testing. Chemistries #71106 and #71108 were down selected for additional testing. This involved room temperature and −320 degrees F. tensile testing. Two 0.200-inch-thick×12.0-inch-wide×24.0-inch-long VPPA weld panels were produced with each filler wire chemistry. On each of the panels, two 3.0-inch-long R5 repair welds were performed using the DCEN gas tungsten arc (GTA) welding process. The repair welds were performed using the same filler wire chemistry used in the initial VPPA weld.

The completed R5 repair welds or the down selected filler wire chemistries were inspected, planished, and reinspected. Four room temperature and four −320 degrees F. repairweld tensile specimens were tested from each filler wire chemistry. The tensile fracture areas from all specimens were processed into metallographic specimens.

For the screening test, 0.200-inch-thick weld test panels were dry machined from 0.375-inch-thick 2195-RT70 plate produced by RMC, Lot #921T894A. The 0.200-inch-thick weld test panels for the down selected testing was machined from 0.250-inch-thick 2195-RT70 plate produced by RMC, Lot #930T649A. Prior to welding, the weld joint edges were draw filed and adjacent weld joint surfaces scraped. Manual tack welding of the weld test panels was performed using DCEN GTA welding. Three autogenous tack welds were made on the panels, with start and stop tabs welded to the panel ends. With 0.063-inch-diameter filler wire, the average weld parameters used in making the repairs welds were 85.0 amps, 19.0 volts, and 8.0 ipm travel rate. The operation consisted of performing five simulated repairs in one location of the panel, alternating from root side to the face side of the weld area. For example, R1, the first repair, was performed on the root side of the VPPA weld, and R2, the second repair, was performed on the face side. R3, R4 and R5 followed with the same alternating pattern. Each repair cycle consisted of filling a 0.100-inch-deep×0.200-inchwide×3.0-inch-long groove using a two pass GTA weld, which was produced using a dye grinder with a carbide cutting wheel. Visual and radiographical inspection was performed per MSFC-SPEC-504C on each of the completed R5 repair welds.

After the R5 repair weld operation, the planishing operation was performed. Planishing was performed in the vertical position using a pneumatm rivet gun with a 1.86-inch-diameter mushroom head and 2.75-inch-diameter steel bucking bar on the opposite side. The repair welds were planished in order to recover approximately 90 percent of the repair weld shrinkage. Visual, radiographic, and penetrant inspection was performed per MSFC-SPEC-504C on each of the planished repair welds. Radiographic inspection was performed at 45 and 90 degrees from weld panel surface.

Figure 2:
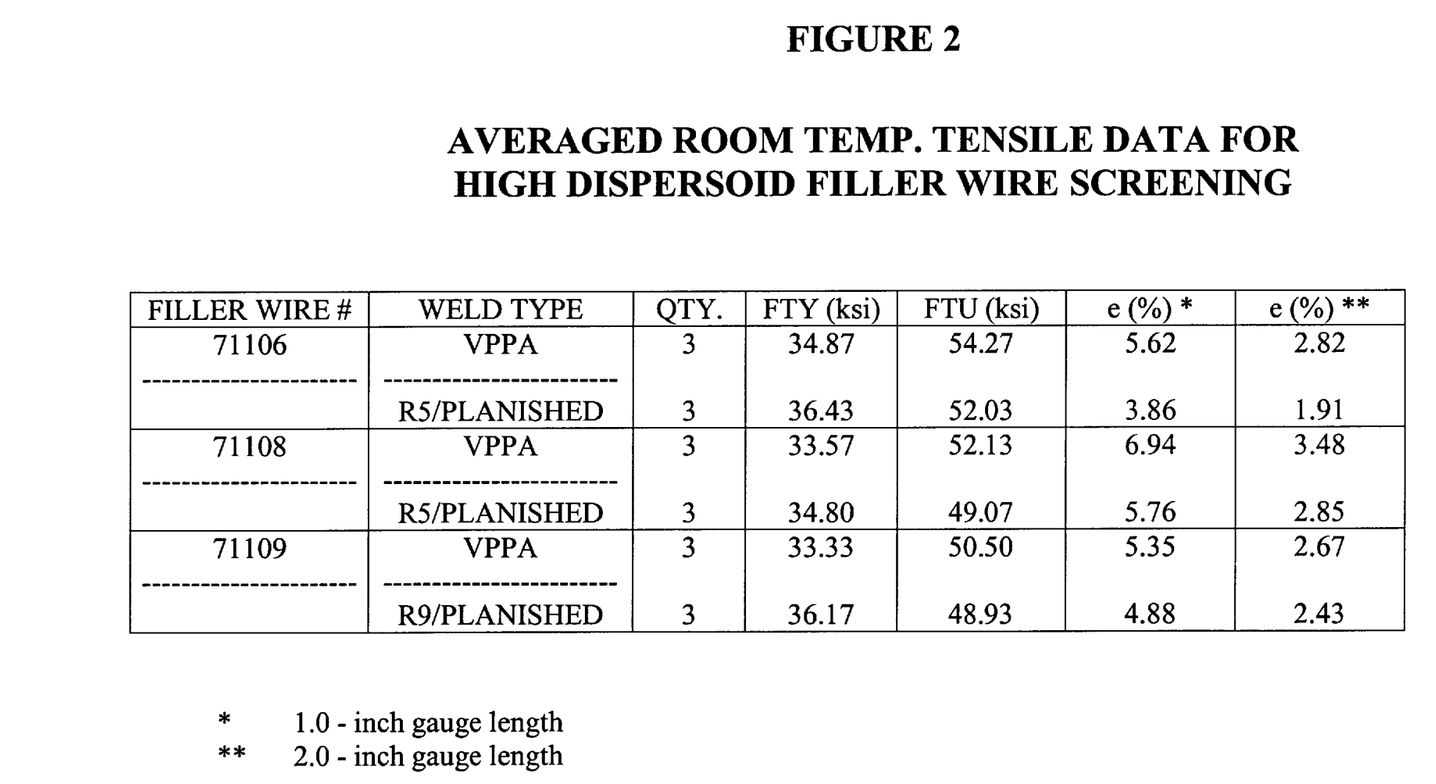
FIG. 2 is a chart illustrating VPPA Weld Tensile Properties for the filler wires shown in FIG. 1 in accordance with the present invention.

Prior to performing the screening test, repair weld practice panels were run. These panels displayed toe cracking in the repair welds made with the #71109 and #71109 filler wire chemistries. The toe cracks ranged from 0.010 to 0.100-inches-in-depth and followed the repair welding fusion line, but not necessarily the VPPA weld fusion line. For the screening test, the repair welding current was reduced from 95.0 to 85.0 amps in order to eliminate the possibility of cracking. From the screening test, VPPA welds made with chemistries #71106, #71108 and #71109 were visually, radiographically, and penetrant inspected with acceptable results. However, for chemistry #71109, radiographic inspection at the R5 level revealed voids in the repair weld, which was welder related. The voids were repaired producing a R9 condition. After the repair, the #71109 repair was successfully planished and inspected. The averaged VPPA and planished R5 repair weld tensile data from the screening test is contained in FIG. 2. Metallographic examination of the VPPA and planished R5 repair welds showed pronounced grain refinement when compared to the 2319 filler wire chemistry.

Figure 3:
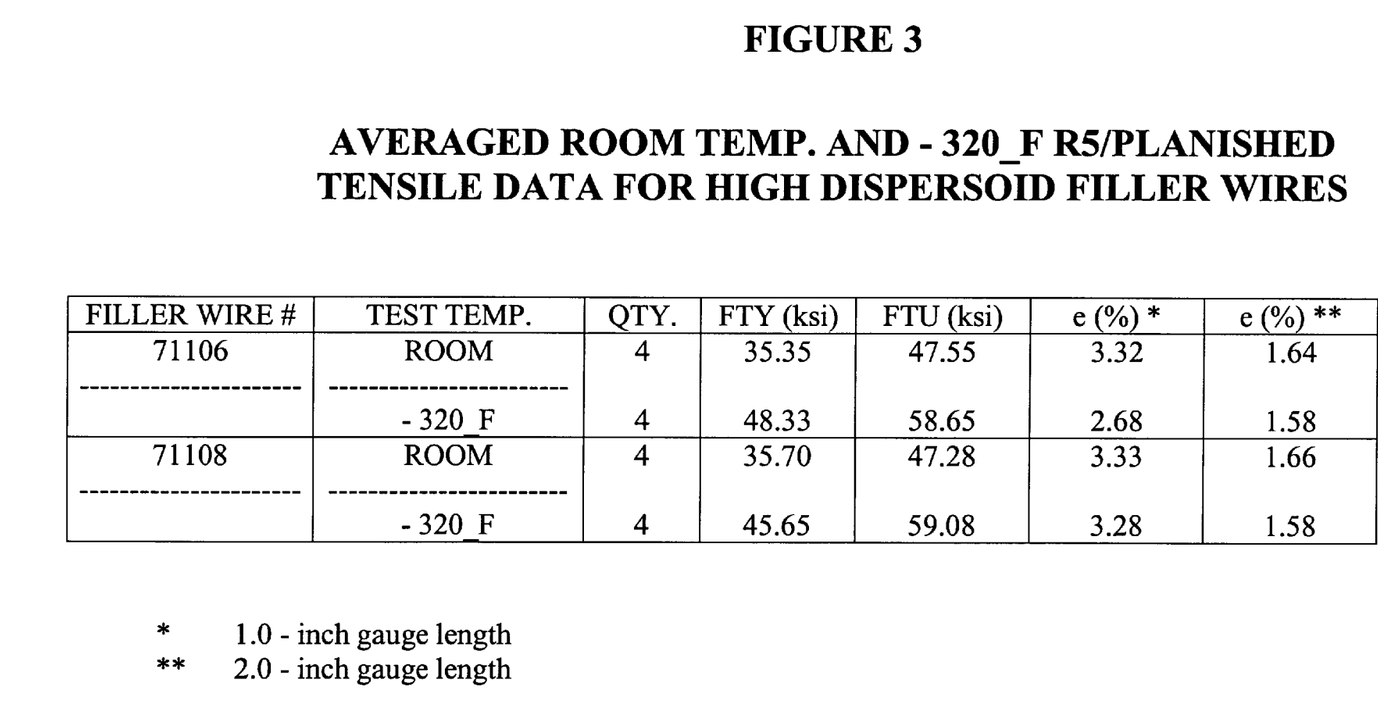
FIG. 3 is a chart illustrating R5/Planished Weld Properties for the filler wires shown in FIG. 1 in accordance with the present invention.

From the down selected chemistries #71106 and #71108, VPPA welds were visually, radiographically, and dye penetrant inspected with acceptable results. Chemistry #71106 had one out of the four R5 repair welds displaying a visual fusion line crack after the last cycle of planishing. This was successfully repaired and planished in one repair cycle, which made it a R6 repair. Chemistry #71108 had one out of the four R5 repair welds displaying a visual fusion line crack after the R5 repair cycle. This was repaired in one cycle and planished, which made it a R6 repair. Averaged room temperature and −320 degrees F. tensile test data is presented in FIG. 3.

From the weld screening test, all three filler wire chemistries produced acceptable VPPA and planished R5 repair weld tensile data. Due to the number of specimens tested, it is difficult to discuss specific chemistry effects. However, for VPPA welds the 6.0% Cu containing filler wire displayed a two ksi higher average ultimate strength over the 4.0% Cu filler wire and approximately a four ksi higher average ultimate strength over the 4.0% Cu filler wire with 0.3% Mn. The Mn addition with high Ti and Zr reduced the ultimate VPPA weld strength. Furthermore, the 4.0% Cu containing filler wires were susceptible to toe cracks in repair weld practice panels, which were run at 95.0 amps of welding current. For the screening and down selected tests, the welding current was reduced to 85.0 amps to reduce toe cracking in the 4.0% Cu filler wire.

Figure 4:
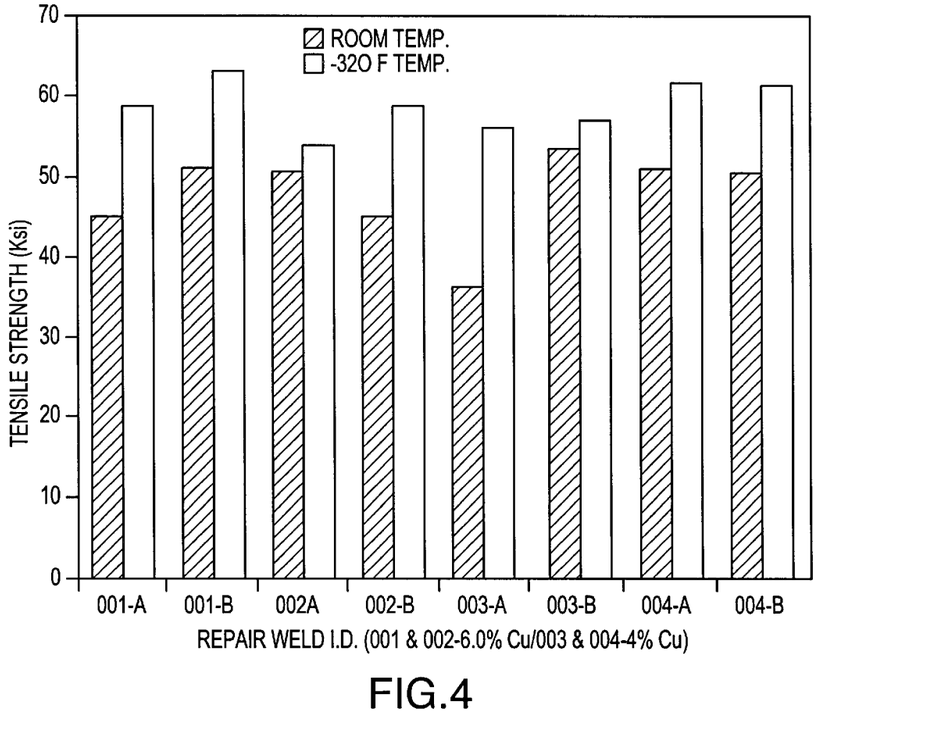
FIG. 4 is a chart illustrating the data shown in FIG. 3 in accordance with the present invention.

From the available metallographic results, it is revealed that all three filler wire chemistries displayed a very fine weld grain structure similar to 2319 filler wire containing 0.22% Zr. The fine weld grain structure was produced without V and Mn additions. This reveals that high levels of Ti and Zr can cause the fine grain structure to form in the weld. From the down selected chemistries, planished R5 repair weld tensiles, which were tested at room temperature and −320 F., produced acceptable results, as shown in FIG. 4. No low tensile values were observed, which had previously been seen using 2319 and 2319 with 0.22% Zr. Keeping in mind the quantity of specimens tested, chemistry #71106 and #71108 showed no significant differences in repair weld tensile data.

The following conclusions can be made from the filler wire testing. The 2319 variants, containing high levels of Ti and Zr, passed R5 repair welding and planishing. There were no low tensile results observed in room temperature and −320 F. tensile tests for the 2319 variants. Due to the least amount of repair weld cracking, the 2319 variant containing six percent copper performed better in repair welding over the four percent copper containing filler wires. The addition of 0.3%. Mn to the high Ti/Zr containing 4.0% Cu filler wire reduced the ultimate strength of VPPA welds.

Figure 5:
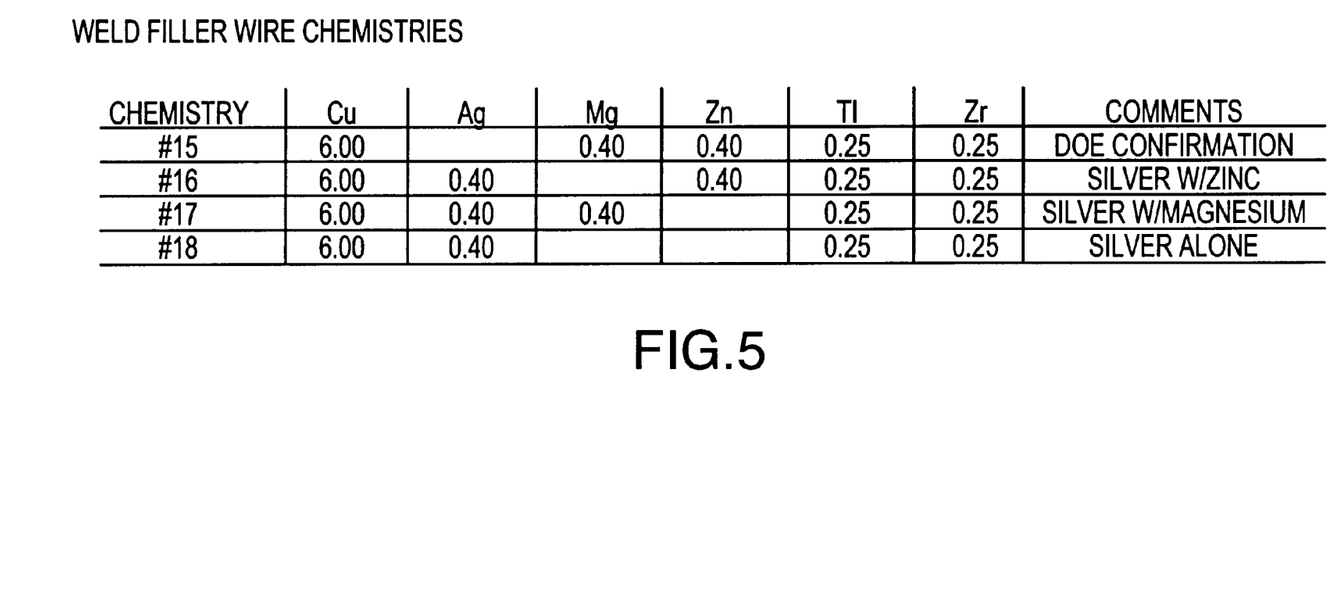
FIG. 5 is a chart illustrating the chemistry of various filler wires in accordance with the present invention.
Figure 6:
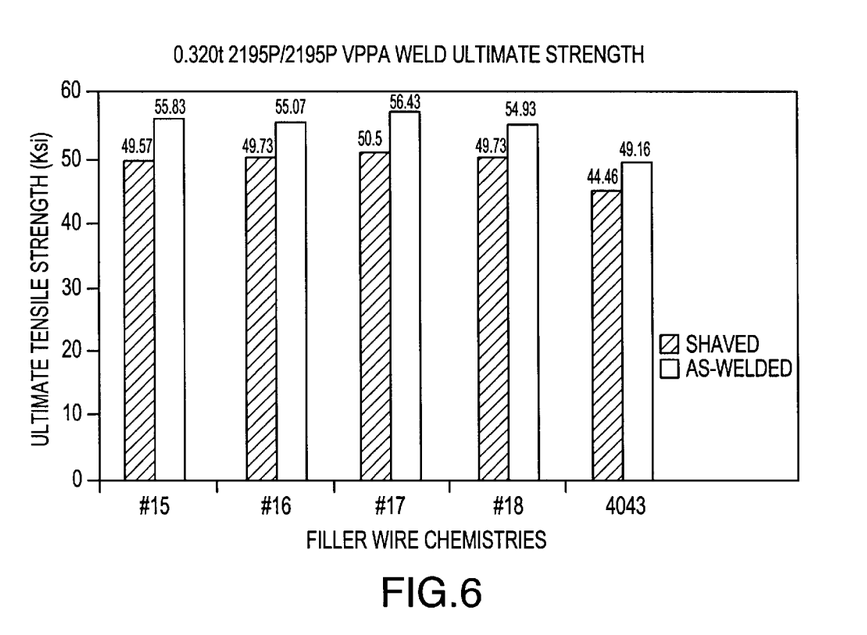
FIG. 6 is a chart illustrating the VPPA Weld Ultimate Strength for the filler wires shown in FIG. 5 in accordance with the present invention.
Figure 7:
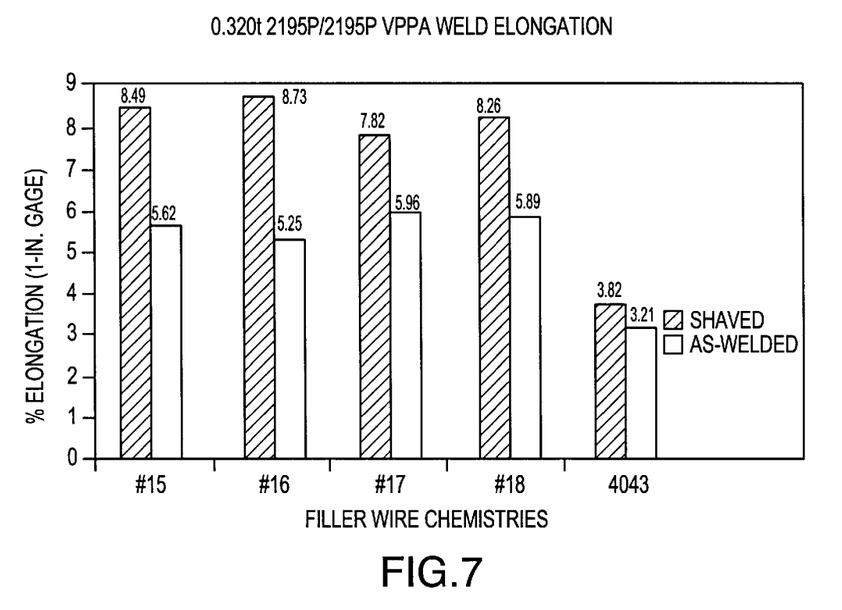
FIG. 7 is a chart illustrating the VPPA Weld Elongation for the filler wires shown in FIG. 5 in accordance with the present invention.
Figure 8:
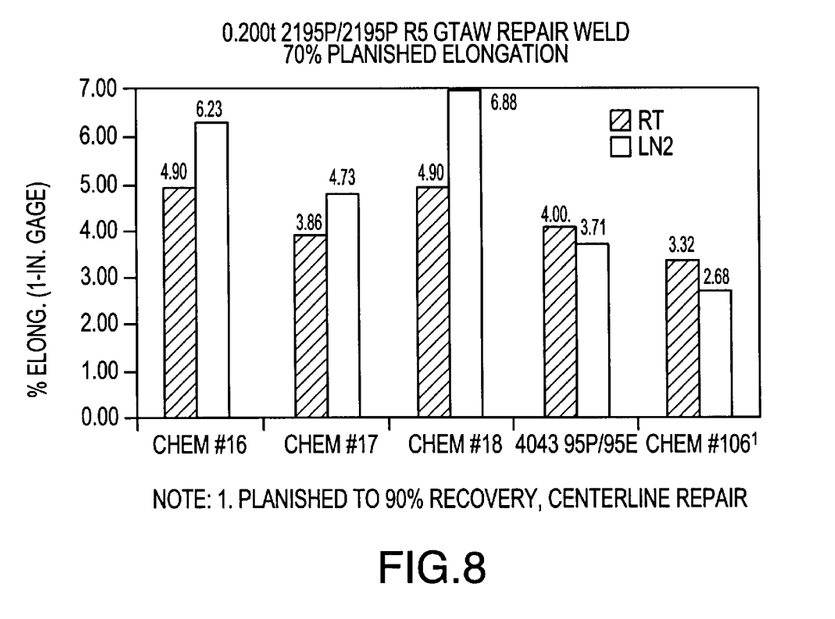
FIG. 8 is a chart illustrating the GTAW Repair Weld Elongation for the filler wires shown in FIG. 5 in accordance with the present invention.

FIGS. 5, 6, 7, and 8 illustrate various material properties of a zirconium/titanium/silver weld filler wire. In this embodiment of weld filler wire, a nominal amount of silver is added to the high zirconium/titanium weld filler wire described above. One embodiment of filler wire has a chemistry of 6.0% copper, 0.40% silver, 0.25% titanium, and 0.25% zirconium, with the remainder aluminum. Additions of 0.4% magnesium and 0.4% zinc can also be added to the filler wire with similar weld mechanical properties. The development of this filler wire chemistry started from the Part I Filler Wire Development Program for 2195 Aluminum-Lithium. As illustrated in FIG. 5, four chemistries were evaluated, one of the chemistries consisted of a confirmation chemistry for the Part I L8 design of experiment, and the remaining three chemistries consisted of nominal copper, high titanium/zirconium, and silver. One of the three had an addition of magnesium, and another had an addition of zinc. All three filler wire chemistries produced 2195 planished R5 repairweld properties equivalent or better than 2195 planished R5 repair welds made with 4043 weld filler wire.

Although the present invention-has been described in several embodiments, various changes and modifications may be suggested to one skilled in the art. It is intended that the present invention encompass such changes and modifications that fall within the scope of the appended claims.

What is claimed is:

1. A weld filler wire, for aluminum alloys, consisting essentially of greater than 0.25 wt % titanium, greater than 0.25 wt % zirconium, about 0.4 wt % silver, and copper, wherein a balance of said weld filler wire consists essentially of aluminum.

2. A weld filler wire, for aluminum alloys, consisting essentially of greater than 0.25 wt % titanium, greater than 0.25 wt % zirconium, silver, and up to about 6 wt % copper, wherein a balance of said weld filler wire consists essentially of aluminum.

3. A weld filler wire, for aluminum alloys, consisting essentially of zirconium, silver, copper, and titanium in an amount greater than 0.25 wt. %, wherein a balance of said weld filler wire consists essentially of aluminum.

4. The weld filler wire of claim 3, wherein said weld filler wire comprises copper in an amount ranging from 4 wt. % to 6 wt. %.

5. The weld filler wire of claim 3, wherein said weld filler wire comprises about 6 wt. % copper.

6. The weld filler wire of claim 3, wherein said weld filler wire comprises about 0.4 wt. % silver.

7. The weld filler wire of claim 3, wherein said weld filler wire comprises greater than 0.25 wt. % zirconium.

8. An aluminum-based weld filler wire, comprising aluminum, silver, greater than 0.25 wt % zirconium, and greater than 0.25 wt % titanium.

9. An aluminum-based weld filler wire, as claimed in claim 8, wherein said silver is present in an amount of about 0.4 wt %.

10. An aluminum-based weld filler wire, as claimed in claim 8, wherein said weld filler wire comprises at least some and at most about 0.4 wt % silver.

11. An aluminum-based weld filler wire, as claimed in claim 8, further comprising manganese.

12. An aluminum-based weld filler wire, as claimed in claim 8, wherein said weld filler wire is devoid of manganese.

13. An aluminum-based weld filler wire, as claimed in claim 8, wherein said weld filler wire is devoid of manganese and vanadium.

14. An aluminum-based weld filler wire, as claimed in claim 8, further comprising copper.

15. An aluminum-based weld filler wire, as claimed in claim 14, wherein said copper is present in an amount of about 6.0 wt %.

16. An aluminum-based weld filler wire, as claimed in claim 14, wherein said copper is present in an amount of about 4.0 wt % up to about 6.0 wt %.

* * * * *